United States Patent
Kausch

(10) Patent No.: US 6,893,731 B2
(45) Date of Patent: May 17, 2005

(54) WATER-BASED COATING COMPOSITION

(75) Inventor: William L. Kausch, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 131 days.

(21) Appl. No.: 09/962,579

(22) Filed: Sep. 25, 2001

(65) Prior Publication Data

US 2003/0211346 A1 Nov. 13, 2003

Related U.S. Application Data

(63) Continuation-in-part of application No. 09/444,907, filed on Nov. 22, 1999, now abandoned.

(51) Int. Cl.$^7$ .................. B32B 27/08; B32B 27/18; B32B 27/26; B32B 27/30; B32B 27/36

(52) U.S. Cl. ............... 428/483; 428/482; 428/483; 428/403; 428/407; 428/446; 428/451; 428/515; 428/520; 428/522; 525/165; 525/167; 525/173; 525/174; 525/175; 525/176; 525/220; 525/221; 525/222; 525/223; 525/224; 427/372.2; 427/299; 427/322; 427/383.7; 427/385.5; 427/532; 427/533; 427/535; 427/536; 264/288.4; 264/289.3; 264/290.2

(58) Field of Search .................. 428/480, 483, 428/482, 403, 407, 446, 451, 515, 520, 522; 525/165, 167, 173, 174, 175, 176, 220, 221, 222, 223, 224; 427/272.2, 372.2, 299, 322, 383.7, 385.5, 532, 533, 535, 536; 264/288.4, 289.3, 290.2

(56) References Cited

U.S. PATENT DOCUMENTS

| | | | |
|---|---|---|---|
| 4,098,952 A | | 7/1978 | Kelly et al. |
| 4,151,227 A | | 4/1979 | Simms ................ 260/885 |
| 4,876,313 A | * | 10/1989 | Lorah ................ 525/281 |
| 5,104,929 A | | 4/1992 | Bilkadi |
| 5,156,904 A | | 10/1992 | Rice et al. |
| 5,310,591 A | * | 5/1994 | Dodge et al. ........ 428/195 |
| 5,356,956 A | | 10/1994 | Uemae et al. ........ 523/201 |
| 5,391,429 A | | 2/1995 | Otani et al. |
| 5,427,835 A | | 6/1995 | Morrison et al. |
| 5,500,457 A | | 3/1996 | Sarkar et al. |
| 5,518,809 A | * | 5/1996 | Henry et al. ........ 428/32.14 |
| 5,624,747 A | * | 4/1997 | Sarkar et al. ........ 428/327 |
| 5,633,049 A | | 5/1997 | Bilkadi et al. |
| 5,668,194 A | | 9/1997 | Ando et al. ........ 523/201 |
| 5,825,543 A | | 10/1998 | Ouderkirk et al. |
| 5,867,316 A | | 2/1999 | Carlson et al. |
| 5,882,774 A | | 3/1999 | Jonza et al. |
| 5,908,874 A | | 6/1999 | Fong et al. |

FOREIGN PATENT DOCUMENTS

| | | |
|---|---|---|
| DE | 3925451 | 6/1990 |
| EP | 0 788 029 | 8/1997 |
| WO | WO94/25499 | 11/1994 |
| WO | WO96/16357 | 5/1996 |
| WO | WO 99/36248 | 7/1999 |
| WO | WO 99/36262 | 7/1999 |
| WO | WO 99/36812 | 7/1999 |
| WO | WO99/67339 | 12/1999 |
| WO | WO 01/22129 | 3/2001 |
| WO | WO 01/38448 A1 * | 5/2001 |

OTHER PUBLICATIONS

"Standard Test Methods for Measuring Adhesion by Tape Test", ASTM Designation: D 3359–95A, pp. 356–362, 1995.

Encyclopedia of Polymer Science and Engineering, vol. 7, $2^{nd}$ edition, pp. 531–543, 1987.

Encyclopedia of Polymer Science and Engineering, vol. 12, $2^{nd}$ edition, pp. 193–216, 1987.

* cited by examiner

*Primary Examiner*—Vivian Chen
(74) *Attorney, Agent, or Firm*—Carolyn A. Bates

(57) ABSTRACT

This invention provides a water-based composition suitable for use on polyester-based substrates for increasing adhesion between the substrate and a topcoat or overcoat. The composition comprises: (1) a latex polymer formed from the polymerization of at least one monomer selected from the group consisting of bicyclic alkyl (meth)acrylates and aromatic (meth)acrylates and at least one monomer which imparts to the polymer the ability to be crosslinked; (2) a water soluble or water dispersible polymer selected from the group consisting of acrylate-based resins, sulfonated polyester-based resins and combinations thereof; and (3) a crosslinking agent.

34 Claims, No Drawings

WATER-BASED COATING COMPOSITION

This application is a continuation-in-part of U.S. application Ser. No. 09/444,907, filed Nov. 22, 1999, abandoned.

This invention relates to a new water-based coating composition. In particular, the composition is suitable for use as a primer layer on polyester-based substrates, to increase the adhesion between the substrate and selected overcoats applied to the substrate.

BACKGROUND

A problem often encountered in the polymer film art relates to the difficulty of providing strong adhesion between substrates and functional coatings applied to them. This is particularly so in the case of polyester-based substrates. To deal with the problem, a primer layer or coating is generally applied to the polyester substrate to improve adhesion between the substrate and an overcoat applied to the substrate. For example, U.S. Pat. No. 4,098,952 (Kelly et al.) describes a primer layer useful for some polyester substrates comprising a copolymer comprising (i) 3 to 25 mole percent of glycidyl methacrylate or glycidyl acrylate, (ii) 35 to 95 mole percent of one or more other copolymerizable monomer selected from the esters of acrylic and methacrylic acids; and (iii) 1 to 60 mole percent of acrylonitrile. Other components can be added to the priming composition. For example, a crosslinking agent, such as alkyl melamines, may be used to crosslink with functional groups, such as hydroxyl and epoxy groups present in the composition. In addition, a catalyst can be used to accelerate the internal crosslinking action of the crosslinking agent and also to accelerate its crosslinking action with the crosslinkable functional groups in the priming copolymer. The priming copolymer can be applied to at least one surface of a support film, which can be any suitable self-supporting synthetic linear polyester film.

U.S. Pat. No. 5,391,429 (Otani et al.) describes a coating layer, useful as an adhesion priming layer for some polyester substrates, comprising at least 50% by weight of a water-soluble or water-dispersible polyester resin having a glass transition temperature of at least 20° C. One exemplary water-soluble or water-dispersible polyester resin is a copolyester having as its components terephthalic acid, sodium sulfoisophthalate, ethylene glycol, and diethylene glycol. The coating layer may optionally contain an additional water-soluble or water-dispersible resin, such as a water-soluble or water-dispersible acrylic resin. The acrylic resin may be in the form of a so-called core-shell polymer having different structures between an inner part and a surface part of each polymer particle.

A particularly difficult adhesion problem is encountered in the manufacture of optical films having a structured surface layer as describe in U.S. Pat. No. 5,908,874. The surface layer is formed from a composition that is polymerized from a radiation-polymerizable mixture of halogenated acrylate monomers. When this composition is coated onto a polyester film, poor adhesion of the coating composition to the polyester film is observed.

Certain sulfopolyesters are known to be useful as "primers" for polyester films. That is, when coated onto the surface of a polyester film, these sulfopolyesters enhance the adhesion of subsequent coatings. However, such known sulfopolyester primers have been found not to enhance sufficiently the adhesion to polyester films of the above-mentioned halogenated acrylate coatings.

Certain acrylate emulsion polymers are also known to be useful as primers for polyester films, and might be expected to provide considerable enhancement of adhesion of acrylate-based topcoats. However, it has been found that such acrylate primer coatings yield both insufficient enhancement of the adhesion to polyester films of the above-mentioned halogenated acrylate coatings, and considerable inconsistency in the measured level of adhesion. It is believed that this inconsistency, and the insufficient adhesion, are the result of the primer coating being dissolved or partially dissolved in the halogenated acrylate topcoat prior to curing of the topcoat.

Since known coatings fail to provide sufficient adhesion between all polyester substrates and all overcoats, especially acrylate-based overcoats, there still exists a need for novel chemical compositions for this purpose.

SUMMARY

Surprisingly, it has been discovered that polyester films can be effectively primed to enhance adhesion of topcoats, particularly, halogenated acrylate topcoats, by the application of a primer coating comprising a crosslinked first polymer formed from the polymerization of at least one monomer selected from the group consisting of bicyclic alkyl (meth)acrylates and aromatic (meth)acrylates; and a second polymer selected from the group consisting of acrylate-based resins, sulfonated polyester-based resins, and combinations thereof.

In one embodiment, the invention pertains to a new water-based coating composition suitable for use on a polyester-based substrate as a primer layer between the substrate and selected overcoats. The inventive aqueous composition comprises:

(a) a first polymer comprising a latex polymer, the latex polymer formed from the polymerization of
   at least one monomer selected from the group consisting of bicyclic alkyl (meth)acrylates and aromatic (meth)acrylates; and at least one monomer which imparts to the polymer the ability to be crosslinked.

(b) a water-soluble or water-dispersible second polymer selected from the group consisting of acrylate-based resins, sulfonated polyester-based resins, and combinations thereof; and (c) a crosslinking agent.

In another embodiment, the invention pertains to a primed film construction comprising a polyester-based substrate layer and a primer coating layer, the coating layer comprising:

(a) a crosslinked first polymer formed from the polymerization of at least one monomer selected from the group consisting of bicyclic alkyl (meth)acrylates and aromatic (meth)acrylates; and (b) a second polymer selected from the group consisting of acrylate-based resins, sulfonated polyester-based resins, and combinations thereof.

In another embodiment, the invention pertains to an article comprising a polyester-based substrate layer, an acrylate-based overcoat, and a primer layer disposed between the substrate layer and overcoat, the primer layer comprising:

(a) a crosslinked first polymer formed from the polymerization of at least one monomer selected from the group consisting of bicyclic alkyl (meth)acrylates and aromatic (meth)acrylates; and (b) a second polymer selected from the group consisting of acrylate-based resins, sulfonated polyester-based resins, and combinations thereof If the primer coating is not crosslinked, the primer is excessively soluble in a topcoat such as the halogenated acrylate topcoat, and consistent and acceptable levels of adhesion do not result. If the second, water-soluble or water-dispersible polymer is not present in the primer coating, acceptable levels of adhesion do not result. Without wishing to be bound by any theory, it is believed that the second, water-soluble or water-dispersible polymer serves to "fill in" spaces between the particles of the first, crosslinked polymer making for a smoother, more continuous primer coating, which in turn helps to contribute to the adhesion. Most surprisingly, if the first, crosslinked polymer does not contain at least one monomer selected from the group consisting of bicyclic alkyl (meth)acrylates and aromatic (meth)acrylates, again acceptable levels of adhesion do not occur.

The inventive coating compositions can also be used to prime polyester films for adhesion to other topcoats, or to prime films other than polyester films for adhesion to acrylate topcoats.

Preferably, the first polymer is or is derived from an acrylate-based core/shell latex polymer. As used in this document, the term "core/shell latex polymer" means a latex containing a plurality of discrete polymer particles, each particle having a core polymer that is partially or substantially completely surrounded by a shell polymer. The term "acrylate-based polymer" includes acrylates and methacrylates, and copolymers of acrylates and/or methacrylates, e.g., a copolymer of an acrylate and styrene.

As used herein, "percent solids by weight" represent the weight percent of solid components in the inventive composition. For example, about 1 to 8 percent solids by weight of a component means that in 100 grams of the inventive composition, there is about 1 to 8 grams of that component. Because the inventive composition is water-based, there is less than 100 percent solids, typically there is less than about 75 percent solids.

The inventive coating composition exists initially in aqueous form, wherein all its components are either dissolved or dispersed in water. Once the composition is coated or applied to a substrate (such as a polyester-based film), dried and cured, the composition becomes a "primer layer." In general, the primer layer acts as a tie layer by providing adhesion to the substrate and adhesion to an overcoat. As used herein, the term "overcoat" means a layer that has been applied to the primer layer so that, in general, the primer layer is sandwiched between the substrate and the overcoat.

DETAILED DESCRIPTION OF THE INVENTION

The first crosslinkable polymer of the inventive coating compositions preferably comprises a core/shell latex polymer in an amount of about 1 to 8 percent solids by weight. A preferred core/shell latex polymer is described in U.S. Pat. No. 5,500,457 (Sarkar et al.), which discloses weight ratio of the core polymer to the shell polymer from about 10:90 to 90:10, preferably from about 25:75 to 50:50. The core polymer has a lower glass transition temperature ($T_g$) than the shell. As used in this document, $T_g$ means, generally, the temperature below which free rotations of the molecules or atoms in the polymer cease because of intra-molecular energy barriers. The $T_g$ for a polymer typically occurs over a temperature range rather than a single, sharply defined temperature.

The $T_g$ of the core polymer preferably ranges from about −60° C. to 20° C., more preferably from about −10° C. to 5° C. The $T_g$ of the shell polymer preferably ranges from about 35° C. to 100° C., more preferably, from about 40° C. to 90° C. When the $T_g$ of the shell polymer reaches below about 35° C., the coating composition becomes soft, possibly resulting in blocking problems. Blocking is an undesirable feature and results when the coating composition adheres to an unintended surface. For example, if blocking occurs, the coating composition adheres not only to one side of the substrate but also adheres to the backside of the same substrate when the product is wound up in a roll.

The core is made from at least one α,β-ethylenically unsaturated monomer having from about 1 to 12 carbon atoms. This monomer makes up from about 60 to 95 parts, preferably from about 75 to 90 parts by weight of the core. The core also contains at least one monomer selected from the group consisting of bicyclic alkyl (meth)acrylates and aromatic (meth)acrylates, which can comprise up to about 40 parts, preferably from about 10 to 25 parts. The core further contains a crosslinkable monomer, preferably at least 5 parts by weight.

The shell can also be formed from at least one α,β-ethylenically unsaturated monomer containing from about 1 to 12 carbon atoms. This monomer may comprise up to 95 parts by weight of the shell, preferably from about 45 to 80 parts by weight. The shell also contains up to about 60 parts by weight, preferably from about 20 to 55 parts by weight, of at least one monomer selected from the group consisting of bicyclic akyl (meth)acrylates and aromatic (meth)acrylates. The shell further contains a crosslinkable monomer, preferably at least 5 parts by weight.

Useful α, β-ethylenically unsaturated monomers include, but are not limited to, methyl acrylate, ethyl acrylate, methyl methacrylate, isobutyl methacrylate, isodecyl methacrylate, cyclohexyl methacrylate, n-butyl acrylate, styrene, vinyl esters, and the like. Preferred monomers include ethyl acrylate and methyl methacrylate. Combinations of these unsaturated monomers can be used, if desired.

Useful bicyclic alkyl (meth)acrylates include, but are not limited to, dicyclopentenyl (meth)acrylate, norbornyl (meth)acrylate, isobornyl methacrylate, and isobornyl acrylate, which is preferred. Combinations of bicyclic alkyl methacrylates can be used, if desired.

The core polymer and/or the shell polymer also contain at least 5 parts by weight of a crosslinkable monomer preferably a polar monomer selected from the group consisting of (1) acrylic acid, methacrylic acid or hydroxyalkyl methacrylates; and (2) nitrogen containing compounds including N-alkylacrylamide, N,N-dialkyl amino monoalkyl methacrylate, N-alkyl amino alkyl methacrylate, and their cationic salts, all of alkyl groups above having up to 8 carbon atoms, preferably up to 2 carbon atoms.

Preferred crosslinkable polar monomers include hydroxyethylacrylate and hydroxyethylmethacrylate, N-methylacrylamide, N-butylmethacrylamide, N-methylolacrylamide, N-butylaminoethyl methacrylate, N-N'-diethylaminoethyl methacrylate, N,N'-dimethyl aminoethyl methacrylate, and isobutyoxy methacrylamide. A particularly preferred polar monomer is hydroxy ethyl methacrylate.

The core/shell latex polymers are polymerized using known emulsion polymerization techniques, which require emulsifiers in the polymerization vessel. Useful emulsifiers include anionic surfactants, non-ionic surfactants, and mixtures thereof Specific examples of useful surfactants have a molecular structure that includes (i) at least one hydrophobic moiety selected from the group consisting of from about $C_6$ to $C_{12}$-alkyl, alkylaryl, and/or akenyl groups, and (ii) at least one anionic group selected from the group consisting of sulfate, sulfonate, phosphate, polyoxyethylene sulfate, polyoxyethylene sulfonate, polyoxyethylene phosphate, and the like, and the salts of such anionic groups, where the salts are selected from the group consisting of alkali metal salts, ammonium salts, tertiary amino salts, and the like.

Illustrative examples of commercially available and useful anionic surfactants for emulsion polymerization of the core/shell latex include sodium lauryl sulfate, available from Stepan Chemical Co. as POLYSTEP™ B-3; sodium lauryl ether sulfate, available from Stepan Chemical Co. as POLYSTEP™ B-12; and sodium dodecyl benzene sulfonate, available from Rhone-Poulenc as SIPONATE™ DS-10.

Useful non-ionic surfactant for emulsion polymerization of the core/shell latex include those whose molecular structure comprises a condensation product of an organic aliphatic or alkyl aromatic hydrophobic moiety with a hydrophilic alkylene oxide such as ethylene oxide. The HLB (Hydrophilic-Lipophilic Balance) of useful non-ionic surfactants is about 10 or greater, preferably from about 10 to 20. The HLB number describes the balance of the size and strength of the hydrophilic (water-loving or polar) groups and lipophilic (oil-loving or non-polar) groups of the surfactant.

Illustrative examples of commercially available and useful non-ionic surfactants for emulsion polymerization of the core/shell latex include nonylphenoxy or octylphenoxy poly(ethyleneoxy)ethanols available from Rhone-Poulenc as, respectively, the IGEPAL™ CA or CO series; $C_{11}$ to $C_{15}$ secondary alcohol ethoxylates available from Union Carbide as the TERGITOL™ 15-S series; and polyoxyethylene sorbitan fatty acid ester available from ICI Chemicals as the TWEEN™ series of surfactants.

Most preferably, the emulsion polymerization of the core-shell latex polymer occurs in the presence of a mixture of anionic surfactant(s) and non-ionic surfactant(s), where the ratio of the anionic to non-ionic surfactant is from about 10:90 to 90:10. A useful range of surfactant (i.e. emulsifier) is from about 1 to 8 weight percent, preferably from about 1.5 to 7 weight percent, and most preferably from about 2 to 5 weight percent, based on the total weight of all the monomers in both the core polymer and shell polymer of the latex polymer.

Water-soluble thermal initiators are also present in the emulsion polymerization of the core/shell latex polymer. Suitable initiators include those selected from the group consisting of potassium persulfate, ammonium persulfate, sodium persulfate, and mixtures thereof, and oxidation-reduction initiators such as the reaction product of the above-mentioned persulfates and reducing agents such as those selected from the group consisting of sodium metabisulfite and sodium bisulfite. The preferred water-soluble initiators are potassium persulfate and ammonium persulfate. Preferably, most water-soluble initiators are used from about 50° C. to 70° C. The oxidation-reduction type initiators are preferably used from about 25° C. to 50° C. Water-soluble initiators comprise from about 0.05 to 2 parts, preferably about 0.1 to 0.5 parts based on the total weight of all the monomers in both the core polymer and shell polymer of the latex polymer.

The water-soluble or water-dispersible second polymer is selected so as to produce a primer layer exhibiting good adhesion to the overcoat and substrate. By "good adhesion," it is meant generally that adhesion between the substrate, primer layer, and overcoat preferably exhibits a rating of 4 to 5 according to ASTM 3359-95a, Test Method B. In the inventive composition, the water-soluble polymer is preferably present in an amount of about 2 to 16 percent solids by weight. Useful water-soluble or water-dispersible second polymers include, but are not limited to, acrylate-based resins, sulfonated polyester-based resins, and mixtures thereof.

Useful acrylate-based resins include, but are not limited to, (1) polyacrylic acid, polymethacrylic acids, and their salts, (2) acrylic emulsion resins and acrylic-styrene copolymer emulsion resins. Preferably, the acrylic polymer and copolymer emulsion is water-based. Illustrative examples of commercially available water-based acrylic emulsions include, but are not limited to, Maincote® HG54D and Maincote® PR-71, both available from Rohm and Haas Co., Philadelphia, Pa., USA. An illustrative example of a commercially available water-based acrylic-styrene copolymer emulsion is Rhoplex® WL-96, also available from Rohm and Haas Co. A preferred acrylate-based resin is described in Example 3 of U.S. Pat. No. 4,098,952 (Kelly et al.). Useful sulfonated polyester-based resins include, but are not limited to, ones taught in, e.g., U.S. Pat. No. 5,427,835 (Morrison et al.).

The crosslinking agent functions to crosslink with functional groups, primarily hydroxyl groups and epoxy groups present in the first polymer in the coating composition. The crosslinking agent preferably is capable of internal crosslinking to provide resistance against solvent penetration. Suitable crosslinking agents may comprise epoxy resins, alkyd resins and/or condensation products of an amine, e.g. melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines with an aldehyde, e.g. formaldehyde. Aziridines are also suitable crosslinking agents.

The crosslinking agent is preferably present in an amount of about 0.1 to 20 percent solids by weight, more preferably about 0.1 to 2 percent solids by weight. Illustrative examples of commercially available crosslinking agents useful for the practice of the invention include, but are not limited to, Cymel® 323 and Cymel® 373, both of which are methylated melamine formaldehyde resin, available from CYTEC Company, West Paterson, N.J., USA.

Surfactants or wetting agents are used in the coating composition to adjust the surface tension of the composition so as to improve its ability to be coated to a substrate. The surfactant useful for the composition, as a whole, may be different than the surfactant useful for the emulsion polymerization process described earlier. Preferred surfactants have an HLB (Hydrophilic-Lipophilic Balance) value of about 7 to 10. The HLB value describes the balance of the size and strength of the hydrophilic (water-loving or polar) groups to the lipophilic (oil-loving or non-polar) groups of the surfactant An illustrative example of a commercially available surfactant is Triton™ X-100, which is octylphenoxy polyethoxy ethanol having an HLB of about 7, commercially available from Union Carbide Chemical Company, Danbury, Conn., USA.

There are several optional components that can be added to the coating composition to aid processing or film handling, once the coating is applied to a substrate. If desired, a catalyst may be used to accelerate the internal crosslinking action of the crosslinking agent. The catalyst can also accelerate the crosslinking action between the crosslinking agent and the functional groups. Suitable catalysts for a melamine crosslinking agent include ammonium chloride, ammonium nitrate, ammonium thiocyanate, ammonium dihydrogen phosphate, ammonium sulfate, diammonium hydrogen phosphate, maleic acid stabilized by reaction with a base, ethylene acrylic acid and morpholinium para toluene sulphonate. If used, the amount of catalyst depends on the amount of crosslinking agent used. When the crosslinking agent is present in an amount of about 0.1 to 2 percent solids by weight, the amount of catalyst present is preferably in an amount of about 0.005 to 1 percent solids by weight.

Slip agents, which are typically small particles, can be used to improve the handling characteristic of the substrate containing the inventive primer layer. In particular, slip agents can aid in the winding-up of a substrate having the inventive composition applied to it (often referred to as the "primed substrate"). A preferred slip agent is polymeric particles, such as polystyrene beads having diameters in the sub-micron ($10^{-6}$ meters) to a few micrometers. If used, the amount of slip agent is preferably about 0.0001 to 10 percent solids by weight, more preferably from about 0.001 to 1 percent solids by weight.

Additives can be added to the inventive composition. They include, for example, anti-static agents, colorants, ultraviolet light stabilizers, hindered amine light stabilizers, and combinations thereof. When used, they are preferably present in an amount of not more than about 10 percent solids by weight. Useful anti-static agents are disclosed in U.S. Pat. No. 5,500,547 (Sarkar et al.) in column 10, lines 4 to 53.

Useful hindered amine light stabilizers include, but are not limited to, the following: (1) Bis-(2,2,6,6-tetramethyl-4-piperidinyl)sebacate, available from Ciba-Geigy Corp., Hawthorne, N.Y. as TINUVIN 770; (2) Bis-(1,2,2,6,6-pentamethyl-4-peperidinyl)-2-n-butyl-2-(3,5-di-tert-butyl-4-hydroxybenzyl)malonate, available from Ciba-Geigy Corp. as TINUVIN 144; (3) propanedioic acid,[(4-methoxyphenyl)-methylene]-bis-(1,2,2,6,6-pentamethyl-4-piperidinyl)ester, available from Clariant Corp., Charlotte, N.C. under product number PR-31; (4) dimethyl succinate polymer with 4-hydroxy-2,2,6,6-tetramethyl-1-piperidine ethanol, available from Ciba-Geigy Corp. as TINUVIN 622; (5) poly[6-[(1,1,3,3-tetramethylbutyl)amino]-s-triazine-2,4-diyl][2,2,6,6-tetramethyl-4-piperidyl)imino]hexamethylene [(2,2,6,6-tetramethyl-4-piperidyl)imino], available from Ciba-Geigy as CHIMASORB 944FL; and (6) low molecular weight (about 435 grams/mole) acetylated hindered amine light stabilizer, available from Ciba-Geigy Corp. as TINUVIN 440.

The coating composition can be formulated in a batch type reactor or vessel by mixing the components together using conventional mixing apparatus and known techniques. The coating composition may be applied to the surfaces of a substrate by any suitable known film coating techniques including, but not limited to, notch bar coating, knife coating, and gravure coating. Once coated on a substrate, the coated film should be dried and/or cured, preferably by heating to a temperature exceeding 70° C. and up to a maximum temperature determined by the nature of the film used. The coated substrate may be partially dried and/or cured. In subsequent steps, an overcoat can be applied to the primer layer.

Preferably, the composition is coated onto the film at about 0.0076 to 0.076 mm (0.0003 to 0.003 inch) wet coating thickness, more preferably from about 0.0076 to 0.025 mm (0.0003 to 0.001 inch). Preferably, the final dry thickness of the primer layer is about 0.01 to 5 micrometer, more preferably from about 0.03 to 0.1 micrometer.

In one inventive embodiment, the primer layer is light transmissible, which means that it transmits at least 70 percent, more preferably at least 80 percent, and most preferably at least 90% of the intensity of light incident upon it. The incident light can be visible light, in the range of about 400 to 770 nanometers, infrared light, ultraviolet light, or any other light in the electromagnetic spectrum.

When the substrate is an oriented polyester-based film, the coating composition can be applied before, during, or after the orientation process. As used herein, "oriented" generally means uniaxial or biaxial drawing of the polyester-based film to impart certain desirable characteristics to the film. The process of orienting film, particularly polyester films, is described in Volume 12 of *The Encyclopedia of Polymer Science and Engineering*, $2^{nd}$ edition, pages 193 to 216. A typical process for fabricating biaxially oriented polyester films contains four main steps: (1) melt extrusion of the polyester resin and quenching it to form a web, (2) drawing the web in the longitudinal or machine direction, (3) subsequently or simultaneously drawing the web in the transverse direction to create a film, and (4) heat setting the film.

In another aspect of the invention, the coating composition is applied to the polyester-based substrate after it has been drawn in the machine direction but before it has been subsequently drawn in the transverse direction. When the coating composition is applied to a previously oriented polyester substrate, it is preferred that the surface of the substrate be pre-treated with a corona discharge, such as, air corona or nitrogen corona treatment. Preferably, the corona treatment is in the range of about 0.2 millijoules per square centimeter ($mJ/cm^2$) of film surface area. Higher corona treatment levels can be used if desired.

The coating composition provides increased adhesion between the substrate and the overcoat. The coating composition has been formulated to provide good adhesion to a polyester-based substrate. Illustrative examples of useful polyester-based substrates include, unoriented, uniaxially oriented, and biaxially oriented polyesters, such as, for example, polyethylene terphthalate (PET), polybutylene terephthalate (PBT), polyethylene napthalate (PEN), polybutylene naphthalate (PBN), and copolymers thereof, and PETG and PCTG amorphous copolymers of polyethylene terephthalate available from Eastman Chemical Co., Kingsport, Tenn.). Polyesters include carboxylate and glycol subunits and can be generated by, for example, (a) reaction of carboxylate monomer molecules with glycol monomer molecules or (b) transesterification. Each carboxylate monomer molecule has two or more carboxylic acid or ester functional groups and each glycol monomer molecule has two or more hydroxy functional groups. Polyesters can be formed using a single type of carboxylate monomer molecule or two or more different types of carboxylate monomer molecules. The same applies to the glycol monomer molecules. Also included within the term "polyester" are polycarbonates, which are derived from the reaction of glycol monomer molecules with esters of carbonic acid.

The properties of a polymer layer or film vary with the particular choice of monomer molecules. Suitable carboxylate monomer molecules for forming the carboxylate subunits of a polyester layer include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid; tri-mellitic acid; sodium sulfonated isophthalic acid; 2,2'-biphenyl dicarboxylic acid and isomers thereof, and lower alkyl esters of these acids, such as methyl or ethyl esters. The term "lower alkyl" refers, in this context, to C1–C10 straight-chained or branched alkyl groups.

Suitable glycol monomer molecules for forming glycol subunits of a polyester layer include ethylene glycol; propylene glycol; 1,4-butanediol and isomers thereof; 1,6- hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof, and 1,3-bis(2-hydroxyethoxy)benzene.

Examples of polyesters useful in creating polyester-based optical films are described, for example, in U.S. Pat. Nos. 5,825,543, 5,882,774 and 5,867,316; PCT Publications WO99/36262, WO 99/36248 and WO 99/36812; and U.S. patent application Ser. No. 09/399531, the contents of which are herein incorporated by reference in their entirety.

In another aspect of the invention, the inventive composition provides good adhesion between polyester substrates and overcoats. One overcoat is 3M™ Scotchlite™ Process Color Series 990 inks that contain vinyl copolymers comprising, vinyl acetate, vinyl alcohol, and vinyl chloride.

Another class of overcoats is disclosed in U.S. Pat. No. 5,908,874 (Fong et al.), which is incorporated herein by reference. These acrylic coats are useful for manufacturing structured surface materials for optical uses and are polymerized from radiation-polymerizable mixtures of halogenated acrylate monomers.

Another class of overcoats can be referred to as "hard coats". A particularly suitable hard coat is disclosed in U.S. Pat. No. 5,104,929 (Bilkadi), which is an abrasion resistant coating comprised of colloidal silicon dioxide particles dispersed in ethylenically unsaturated aliphatic and/or cycloaliphatic monomers that are substituted by a protic group. In particular, the coating composition curable to an abrasion and weather resistant coating comprising a non-aqueous dispersion of colloidal silicon dioxide particles of diameters less than 100 millimicrometers in a protic group-substituted ester or amide of acrylic or methacrylic acid.

wherein the protic group-substituted ester or amide or acrylic acid is one or more compounds having the formula:

$A^1\text{-}Z\text{-}A^2$ wherein $A^1$ and $A^2$ independently are poly(acryloyloxy)-alkoxypropyl groups having the general formula:

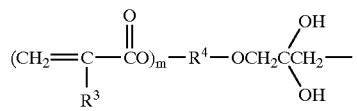

in which each $R^3$ is independently a hydrogen atom or methyl group;

m is an integer of 1 to 5;

$R^4$ is the residue of an aliphatic polyol having (m+1) primary hydroxyl groups (said residue being formed by the removal of hydroxy groups from the polyol) and containing 1 to 10 carbon atoms and optionally one ether oxygen atoms; and z is a heterocyclic group of the formula:

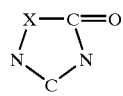

wherein
X is a divalent group which is required to complete a five or six membered heterocyclic ring.

Another suitable hard coat is disclosed in U.S. Pat. No. 5,633,049, which is an acid- and abrasion-resistant coating prepared from a silica-free protective coating precursor composition comprising a multifunctional ethylenically unsaturated ester of acrylic acid, a multifunctional ethylenically unsaturated ester of methacrylic acid, or a combination thereof; and an acrylamide.

The first major component of the hard coat is a multifunctional ethylenically unsaturated ester of an acrylic or methacrylic acid (i.e., a multifunctional acrylate or methacrylate), which is preferably capable of hydrogen bonding and capable of imparting hardness to the coating. Preferred multifunctional ethylenically unsaturated esters of (meth)acrylic acid can be described by the formula:

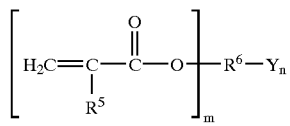

wherein $R^5$ is hydrogen, halogen or a $(C_1\text{--}C_4)$alkyl group (preferably $R^5$ is hydrogen or a methyl group); $R^6$ is a polyvalent organic group, which can be cyclic, branched, or linear, aliphatic, aromatic, or heterocyclic, having carbon, hydrogen, nitrogen, nonperoxidic oxygen, sulfur, or phosphorus atoms; Y is hydrogen, $(C_1\text{--}C_4)$alkyl, or a protic functional group m is an integer designating the number of acrylic or methacrylic groups in the ester and has a value of at least 2; and n has a value of the valence of $R^6$-m. Referring to this formula, preferably $R^6$ has a molecular weight of about 14–100, m has a value of 2–6 (more preferably m has a value of 2–5, most preferably m has a value of 3–4, or where a mixture of multifunctional acrylates and/or methacrylates are used, m has an average value of about 2.05–5), n is an integer having a value of 1 to 3, and Y is a protic functional group. Preferred protic functional groups are selected from the group consisting of —OH, —COOH, —SH, —PO(OH)$_2$, —SO$_3$H, and —SO(OH)$_2$.

In general, the acrylamide is of the formula:

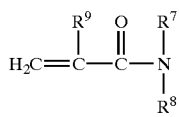

wherein:

(A) $R^7$ and $R^8$ are each independently hydrogen, a $(C_1\text{--}C_8)$ alkyl group optionally having hydroxy, halide, carbonyl, and amido functionalities, a $(C_1\text{--}C_8)$ alkylene group optionally having carbonyl and amido functionalities, a $(C_1\text{--}C_4)$ aryl group, a $(C_1\text{--}C_3)$alk$(C_4\text{--}C_8)$aryl group, and a $(C_4\text{--}C_{18})$ heteroaryl group; with the proviso that only one of the $R^7$ and $R^8$ is hydrogen; and (B) $R^9$ is hydrogen, a halogen, or a methyl group.

EXAMPLES

The following examples are provided to illustrate different embodiments and details of the invention. Although the examples serve this purpose, the particular ingredients and amounts used as well as other conditions and details are not to be construed in a manner that would unduly limit the scope of this invention. Unless otherwise specified, all percentages are in weight percent.

Adhesion Testing

The adhesion between an acrylate-based overcoat, the inventive coating composition, and a polyester-based substrate was determined by using Standard Test Methods for Measuring Adhesion by Tape Test under ASTM D 3359-95a. In all examples described below, Test Method B—"Cross-Cut Tape Test," where eleven (11) cuts in each direction were made in the coating film. The test method also provides for a rating scale, for classification of the adhesion testing. A rating value of 1 means there is little to no adhesion between the various layers and the substrate. A rating value of 4 to 5 means there is good adhesion between the various layers and the substrate.

The ultraviolet-light curable acrylate-based overcoat used in all Examples was of the formula of Example 1 in U.S. Pat. No. 5,908,874.

For convenience, the following abbreviations are used in the Examples.

flux of 0.2 mJ/cm$^2$. In a small container equipped with a conventional mixing device, various 100 gram batches of the water-based composition was made with various components in amounts (all in grams) as specified in Table 2. The composition was coated on PET film. The coated PET film was dried in an oven at about 107° C. (225° F.) for about 30 seconds. The final dry thickness of the primer layer was in the preferred range of 0.03 to 0.1 micrometer. On the exposed surface of the coated composition, the ultraviolet (UV) light curable acrylate-based monomer mixture was

TABLE 1

Various Components Used for the Water-based Coating Composition

| Components | Description |
| --- | --- |
| C/S Latex | Core/shell latex polymer at about 34% solids. The core is polymerized from 10% isobornyl acrylate, 75% ethyl acrylate, 10% methyl methacrylate, and 5% hydroxyethyl methacrylate monomers. The shell is polymerized from 35% isobornyl acrylate, 20% ethyl acrylate, 40% methyl methacrylate, and 5% hydroxyethyl methacrylate monomers, and the ratio of core to shell is 40:60. |
| SPET | Sulfonated polyester, a water-soluble polymer at about 20% solids, prepared as "Polymer A" of U.S. Pat. No. 5,427,835.. |
| HG54D | Waterborne acrylic resin, a latex emulsion polymer at about 41% solids, commercially available from Rohm and Haas as Maincote ® HG54D |
| WL96 | Waterborne acrylic-styrene polymer, a latex emulsion polymer at about 42% solids, commercially available from Rohm and Haas as Rhoplex ® WL96 |
| PR71 | Waterborne acrylic resin, a latex emulsion polymer at about 50.6% solids, commercially available from Rohm and Haas as Maincote ® PR71 |
| PVDC | Polyvinylidene chloride polymer latex, a latex emulsion polymer at about 22.7% solids. |
| SL-112 | Polyvinylidene chloride polymer latex, a latex emulsion polymer at about 53% solids, commercially available from Hampshire Chemical Co. |
| Example 3 of U.S. Pat. No. 4,098,952 | A latex composition containing 35 mol % ethyl acrylate, 21 mol % methyl (meth)acrylate, 7 mol % glycidyl (meth)acrylate, 1 mol % hydroxyethyl (meth)acrylate, and 36 mol % acrylonitrile; a latex emulsion polymer at about 30% solids. |
| C-373 | Aqueous methylated melamine-formaldehyde resin, a crosslinking agent at about 80% solids, commercially available from Cytec Industries as Cymel ® 373 |
| C-323 | Aqueous methylated melamine-formaldehyde resin, a crosslinking agent at about 88% solids, commercially available from Cytec Industries as Cymel ® 323 |
| PTSA | Para-toluene sulfonic acid, a catalyst at 100% solids, commercially available from Aldrich Chemical Company. |
| Maleic Acid | A catalyst supplied at 100% by the Aldrich Chemical Company, but used at 10% solids by weight solution (by diluting 10 grams of catalyst in 90 grams of water). |
| X-100 | Octylphenoxy polyethoxy ethanol, a surfactant supplied at 100% solids by the Union Carbide Co. as Triton ® X-100, but used at a 10% solids by weight solution (by diluting 10 grams of surfactant in 90 grams of water). |
| DI Water | De-ionized water |

Examples 1 to 25

A previously biaxially oriented PET film having a thickness of about 0.13 mm (0.005 inch) was corona treated at coated and UV cured. The adhesion between acrylated-based film, the primer layer, and the PET film was tested in accordance with ASTM D 3359-95a Test Method B, using a rating scale of 1 to 5.

TABLE 2

Components for Examples 1 to 25 (in grams)

| Sample | C/S | SPET | HG 54D | WL 96 | PR 71 | PVDC | SL-112 | C-373 | C-323 | PTSA | X-100 | DI Water | Adhesion |
| --- | --- | --- | --- | --- | --- | --- | --- | --- | --- | --- | --- | --- | --- |
| 1 | 4.4 | 0 | 0 | 3.6 | 0 | 0 | 0 | 0.625 | 0 | 0.04 | 1 | 90.3 | 4–5 |
| 2 | 4.4 | 7.5 | 0 | 0 | 0 | 0 | 0 | 0.625 | 0 | 0.04 | 1 | 86.4 | 4 |
| 3 | 4.4 | 7.5 | 0 | 0 | 0 | 0 | 0 | 0 | 1.2 | 0.04 | 1 | 85.9 | 4 |

TABLE 2-continued

Components for Examples 1 to 25 (in grams)

| Sample | C/S | SPET | HG 54D | WL 96 | PR 71 | PVDC | SL-112 | C-373 | C-323 | PTSA | X-100 | DI Water | Adhesion |
|---|---|---|---|---|---|---|---|---|---|---|---|---|---|
| 4 | 4.4 | 0 | 3.6 | 0 | 0 | 0 | 0 | 0 | 1.2 | 0.04 | 1 | 89.8 | 4 |
| 5 | 2.9 | 0 | 4.8 | 0 | 0 | 0 | 0 | 0.625 | 0 | 0.04 | 1 | 90.6 | 5 |
| 6 | 4.4 | 0 | 2.4 | 0 | 0 | 0 | 0 | 0.625 | 0 | 0.04 | 1 | 91.5 | 4–5 |
| 7 | 4.4 | 7.5 | 0 | 0 | 0 | 0 | 0 | 0.625 | 0 | 0.04 | 1 | 86.4 | 4 |
| 8 | 4.4 | 0 | 3.6 | 0 | 0 | 0 | 0 | 0.625 | 0 | 0.04 | 1 | 90.3 | 4 |
| 9 | 4.4 | 0 | 0 | 0 | 3 | 0 | 0 | 0.625 | 0 | 0.04 | 1 | 90.9 | 4 |
| 10 | 5.9 | 0 | 0 | 0 | 0 | 0 | 0 | 2.5 | 0 | 0 | 1.5 | 90.1 | 0 |
| 11 | 1.5 | 0 | 0 | 0 | 0 | 0 | 0 | 1.25 | 0 | 0 | 1 | 96.3 | 0 |
| 12 | 2.9 | 0 | 0 | 0 | 0 | 4.4 | 0 | 1.25 | 0 | 0 | 1 | 90.5 | 0 |
| 13 | 1.5 | 0 | 0 | 0 | 0 | 8.8 | 0 | 0.6 | 0 | 0 | 1 | 88.1 | 0 |
| 14 | 5.9 | 0 | 0 | 0 | 0 | 2.2 | 0 | 0.6 | 0 | 0 | 1 | 90.3 | 2 |
| 15 | 4.1 | 0 | 0 | 0 | 0 | 6.2 | 0 | 0.25 | 0 | 0 | 1 | 88.5 | 2 |
| 16 | 1.5 | 0 | 0 | 0 | 0 | 0 | 4.4 | 0.6 | 0 | 0 | 1 | 92.5 | 2 |
| 17 | 2.9 | 0 | 0 | 0 | 0 | 0 | 2.0 | 1.25 | 0 | 0 | 1 | 92.9 | 0 |
| 18 | 5.9 | 0 | 0 | 0 | 0 | 2.2 | 0 | 1.4 | 0 | 0.01 | 1 | 89.5 | 2 |
| 19 | 0 | 0 | 0 | 0 | 4 | 0 | 0 | 1.25 | 0 | 0.03 | 1 | 93.7 | 3 |
| 20 | 0 | 0 | 4.8 | 0 | 0 | 0 | 0 | 1.25 | 0 | 0.03 | 1 | 92.9 | 2–3 |
| 21 | 0 | 0 | 0 | 4.75 | 0 | 0 | 0 | 1.25 | 0 | 0.03 | 1 | 93.0 | 3–4 |
| 22 | 0 | 7.5 | 0 | 0 | 4.4 | 0 | 0 | 0.625 | 0 | 0.04 | 1 | 86.4 | 4 |
| 23 | 0 | 7.5 | 3.6 | 0 | 0 | 0 | 0 | 0.625 | 0 | 0.04 | 1 | 87.2 | 3 |
| 24 | 0 | 0 | 0 | 4.75 | 0 | 0 | 0 | 0.625 | 0 | 0.04 | 1 | 93.6 | 2 |
| 25 | 0 | 7.5 | 0 | 3.6 | 0 | 0 | 0 | 0.625 | 0 | 0.04 | 1 | 87.2 | 3 |

Examples 1 to 9 in Table 2 indicates that when a combination of the core-shell latex and an appropriate water-soluble or water-dispersible polymer is used, good to excellent adhesion of the layers is achieved. Not all water-soluble or water-dispersible polymers, however, provided good adhesion. For example, in Examples 12 to 18, water-soluble or water-dispersible polymers such as PVDC or SL-112 did not provide good adhesion, even when the core-shell latex was used.

When core-shell latex was used without the water-soluble or water-dispersible polymer (Examples 10 to 11) or when the water-soluble or water-dispersible polymer was used without core-shell latex (Examples 19 to 25), insufficient adhesion between the layers was observed.

Example 26

A crosslinkable latex composition which does not contain at least one monomer selected from the group consisting of bicyclic alkyl (meth)acrylates and aromatic (meth)acrylates was prepared as described in Example 3 of U.S. Pat. No. 4,098,952 (Kelly et al.), the components being listed in Table 1 above. The latex was diluted with deionized water to 3.5% solids content and 0.15 weight percent of a surfactant, Trition™ X-100 was added.

A previously biaxially oriented PET film having a thickness of about 0.13 mm (0.005 inch) was corona treated at flux of 0.2 mJ/cm². The latex was coated on to the PET film and dried in an oven at about 107° C. (225° F.) for about 30 seconds. The dry coating thickness was about 0.1 micrometers. On the surface of the latex, the ultraviolet (UV) light curable acrylate-based monomer was coated and UV cured. The adhesion between acrylate film, the latex, and the PET film was tested in accordance with ASTM D 3359-95a Test Method B. The adhesion was observed to be about 1, using a rating scale of 1 to 5.

Examples 27 to 29

To the latex composition of Example 3 of U.S. Pat. No. 4,098,952, additional components were added according to Table 3 to yield a coating composition. The amount of each component is given in grams. A total batch size of 17,000 grams was made for each example. Maleic acid was used as a catalyst in the formulations. The composition was coated on to a 0.38 mm (0.015 inch) uniaxially oriented PET film and forced air dried in an oven at about 107° C. (225° F.) for about 30 seconds. The PET film was then oriented in the transverse direction to a final film thickness of about 0.13 mm (0.005 inch). On the surface of the primed layer, the ultraviolet light curable acrylate-based monomer was coated and UV cured. The adhesion between acrylate film, the primer layer, and the PET film was tested in accordance with ASTM D 3359-95a Test Method B and a rating scale of between 1 to 5.

TABLE 3

Components for Examples 27 to 29 (in grams)

| Example | Example 26 Composition | C/S | C-373 | C-323 | X-100 | Maleic Acid | DI Water | Adhesion |
|---|---|---|---|---|---|---|---|---|
| 27 | 2056 | 0 | 120 | 719 | 255 | 17 | 13833 | 1 |
| 28 | 2056 | 1875 | 0 | 120 | 255 | 17 | 12677 | 4 |
| 29 | 2056 | 1875 | 132 | 120 | 255 | 17 | 12545 | 5 |

Example 27 showed that when the polymer of Example 26 (as formulated from the coating composition of Example 3 of U.S. Pat. No. 4,098,952) was used alone, poor adhesion between and among the layers was observed. In contrast, when the core/shell latex is used with the formulation of Example 26, there was a significant increase in adhesion of the layers, as shown in Examples 28 and 29. Thus, in the formulations of Examples 28 and 29, the crosslinkable latex polymer which does not contain at least one monomer selected from the group consisting of bicyclic alkyl (meth) acrylates and aromatic (meth)acrylates (the polymer of Example 26) serves the role of the second, water-soluble or water-dispersible polymer. Thus, the second polymer may be crosslinkable or non-crosslinkable to be effective in the inventive formulations.

All references cited above, including patents discussed in the Background, are incorporated by reference in their entirety into this document.

The present invention may be suitably practiced in the absence of any element or item not specifically described in this document.

What is claimed is:

1. A water-based composition suitable for coating a polyester-based substrate, the composition comprising:
   (a) a first polymer comprising a core-shell latex polymer form from the polymerization of
       at least one monomer selected from the group consisting of bicyclic alkyl (meth)acrylates and aromatic (meth)acrylates;
       and at least one monomer which imparts to the first polymer the ability to be crosslinked
   (b) a water-soluble or water-dispersible second polymer select from the group consisting of acrylate-based resins, sulfonated polyester-based resins, and combinations thereof; and
   (c) a crosslinking agent.

2. The composition of claim 1, wherein the monomer which imparts to the first polymer the ability to be crosslinked has a hydroxyl group or an epoxy group.

3. The composition of claim 1, wherein the crosslinking agent is a melamine crosslinking agent.

4. The composition of claim 3 wherein the melamine crosslinking agent is present at from about 0.1 to 2 percent solids by weight.

5. The composition of claim 1, further comprising a surfactant.

6. The composition of claim 5, wherein the surfactant is present at from about 0.05 to 0.2 percent solids by weight.

7. The composition of claim 5, wherein the surfactant is octyl polyethyoxy ethanol.

8. The composition of claim 1, wherein the core has a lower Tg than the shell.

9. The composition of claim 1, wherein:
   (1) the core is formed from (i) about 60 to 95 parts by weight of at least one α, β-ethylenically unsaturated monomer having from about 1 to 12 carbon atoms; (ii) 0 to about 35 parts by weight of at least one monomer selected from the group consisting of bicyclic alkyl (meth)acrylates and aromatic (meth)acrylates; and (iii) at least 5 parts by weight of a polar monomer, based on a total weight of the core; and
   (2) the shell formed from (i) about 35 to 95 parts by weight of at least one α, β-ethylenically unsaturated monomer having from about 1 to about 12 carbon atoms; (ii) 0 to about 60 parts by weight of at least one monomer selected from the group consisting of bicyclic alkyl (meth)acrylates and aromatic (meth)acrylates; and (iii) at least 5 parts by weight of a polar monomer, based on the total weight of the shell.

10. The composition of claim 9, wherein the α, β-ethylenically unsaturated monomer is selected from the group consisting of methyl acrylate, ethyl acrylate, methyl methacrylate, isobutyl methacrylate, isodecyl methacrylate, cyclohexyl methacrylate, n-butyl acrylate, styrene, vinyl esters, and combinations thereof.

11. The composition of claim 9, wherein the monomer selected from the group consisting of bicyclic alkyl (meth) acrylates and aromatic (meth)acrylates is selected from the group consisting of dicyclopentenyl (meth)acrylate, norbornyl (meth)acrylate, isobornyl (meth)acrylate, and combinations thereof.

12. The composition of claim 9, wherein the polar monomer is selected from the group consisting of (meth)acrylic acid, hydroxyalkyl (meth)acrylates; N-alkylacrylamide; N,N-dialkyl amino alkyl (meth)acrylate; monoalkyl amino alkyl (meth)acrylate, the cationic salt of N,N-dialkyl amino alkyl (meth)acrylate, and N-alkyl amino alkyl (meth) acrylate, wherein all of the alkyl groups containing up to about 12 carbon atoms, and combinations thereof.

13. The composition of claim 1, wherein the first polymer is present at from about 1 to 8 percent solids by weight.

14. The composition of claim 1, wherein the second polymer is present at from about 2 to 16 percent solids by weight.

15. The composition of claim 1, wherein the crosslinking agent is present at from about 0.2 to 20 percent solids by weight.

16. The composition of claim 1, wherein the crosslinking agent comprises at least one component selected from the group consisting of epoxy resins, alkyd resins, alkyl melamines, aryl melamines, benzo guanamines, guanamines, alkyl guanamines, aryl guanamines with an aldehyde, and combinations thereof.

17. The composition of claim 1, wherein the crosslinking agent is methylated melamine formaldehyde resin.

18. The composition of claim 1 further comprising from about 0.0001 to 10 percent solids by weight of a slip agent having an average particle size from about 0.1 micrometer to 10 micrometer.

19. The composition of claim 1 further comprising from about 0.005 to 1.0 percent solids by weight of a catalyst selected from the group consisting of para-toluene sulfonic acid and maleic acid.

20. A method of making a primed biaxially oriented polyester film, the method comprising the steps of:
    (a) providing a uniaxially oriented polyester film having a major surface, the film being stretched in machine direction;
    (b) coating the composition of claim 1 onto the major surface of the uniaxially oriented film;
    (c) partially drying the coating composition; and
    (d) stretching the uniaxially oriented film in a transverse direction.

21. The method of claim 20, wherein the biaxially oriented film is polyethylene terephthalate.

22. A method of making a primed biaxially oriented film, the method comprising the steps of:
    (a) providing a biaxially oriented polyester film having a major surface;
    (b) treating at least a portion of the major surface of the film with a surface treatment;
    (c) coating the composition of claim 1 onto at least a portion the major surface of the biaxially oriented film; and
    (d) drying the coating composition.

23. The method of claim 22, wherein the surface treatment is selected from the group consisting of nitrogen corona and air corona treatment.

24. The method of claim 23, wherein the corona treatment is about 0.2 millijoules per square meter.

25. A primed film construction, comprising a polyester-based substrate layer and a primer coating layer, the coating layer comprising:
   (a) a crosslinked first polymer formed from the polymerization of at least one monomer selected from the group consisting of bicyclic alkyl (meth)acrylates and aromatic (meth)acrylates; and
   (b) a second polymer selected from the group consisting of acrylate-based resins, sulfonated polyester-based resins, and combinations thereof.

26. The film of claim 25, wherein the substrate is selected from the group consisting of polyethylene terephthalate, oriented polyethylene terephthalate, polyethylene naphthalate, oriented polyethylene naphthalate, and copolymers of polyethylene terephthalate and polyethylene naphthalate.

27. The film of claim 25, wherein the coating layer is light transmissible.

28. An article comprising a polyester-based substrate layer, an acrylate-based overcoat, and a primer layer disposed between the substrate layer and overcoat, the primer layer comprising:
   (a) a crosslinked first polymer comprising at least one monomer selected from the group consisting of bicyclic alkyl (meth)acrylates and aromatic (meth)acrylates; and
   (b) a second polymer selected from the group consisting of acrylate-based resins, sulfonated polyester-based resins, and combinations thereof.

29. The article of claim 28 wherein said acrylate-based overcoat is formed from a mixture of monomers comprising halogenated acrylate monomers.

30. The article of claim 28, wherein the adhesion between the substrate, the primer layer, and the overcoat has a value of between 4 to 5 as measured under ASTM D 3359-95a, Test Method B.

31. An article comprising a polyester-based substrate layer, a hard coat and a primer layer disposed between the substrate layer and the hard coat, the primer layer comprising
   (a) a crosslinked first polymer comprising at least one monomer selected from the group consisting of bicyclic alkyl (meth)acrylates and aromatic (meth)acrylates; and
   (b) a second polymer selected from the group consisting of acrylate-based resins, sulfonated polyester-based resins, and combinations thereof.

32. The article of claim 31 wherein the hardcoat is formed from a composition comprising colloidal silicon dioxide particles dispersed in ethylenically unsaturated aliphatic and/or cycloaliphatic monomers that are substituted by a protic group.

33. A water-based composition suitable for coating a polyester-based substrate, the composition comprising:
   (a) a first polymer comprising a latex polymer formed from the polymerization of
      at least one monomer selected from the group consisting of bicyclic alkyl (meth)acrylates and aromatic (meth)acrylates;
      and at least one monomer which imparts to the first polymer the ability to be crosslinked
   (b) a water-soluble second polymer selected from the group consisting of acrylate-based resins, sulfonated polyester-based resins, and combinations thereof; and
   (c) a crosslinking agent.

34. A water-based composition suitable for coating a polyester-based substrate, the composition comprising:
   (a) a first polymer comprising a latex polymer formed from the polymerization of
      at least one monomer selected from the group consisting of bicyclic alkyl (meth)acrylates and aromatic (meth)acrylates;
      and at least one monomer which imparts to the first polymer the ability to be crosslinked
   (b) a water-soluble or water-dispersible sulfonated polyester-based resin; and
   (c) a crosslinking agent.

* * * * *

UNITED STATES PATENT AND TRADEMARK OFFICE
CERTIFICATE OF CORRECTION

PATENT NO. : 6,893,731 B2
DATED : May 17, 2005
INVENTOR(S) : Kausch, William L.

It is certified that error appears in the above-identified patent and that said Letters Patent is hereby corrected as shown below:

Column 2,
Line 65, after "thereof" insert -- . --.

Column 4,
Line 26, delete "akyl" and insert -- alkyl --, therefore.
Line 37, delete "norbomyl" and insert -- norbornyl --, therefore.
Lines 54-55, delete "dimethyl aminoethly" and insert -- dimethylaminoethly --, therefore.

Column 5,
Line 48, after "thereof" delete "," and insert -- ; --, therefore.

Column 8,
Line 61, after "thereof" delete "," and insert -- ; --, therefore.
Line 64, delete "C1-C10" and insert -- $C_1$-$C_{10}$ --, therefore.

Column 9,
Line 6, after "thereof" delete "," and insert -- ; --, therefore.
Line 34, after "acid" delete ".".

Column 10,
Line 23, after "group" insert -- ; --.

Column 15,
Line 27, after "crosslinked" insert -- . --.
Line 29, delete "select" and insert -- selected --, therefore.

Column 16,
Line 7, delete "isobomyl" and insert -- isobornyl --, therefore.
Line 27, delete "alkyd" and insert -- alkyl --, therefore.

UNITED STATES PATENT AND TRADEMARK OFFICE
CERTIFICATE OF CORRECTION

PATENT NO. : 6,893,731 B2
DATED : May 17, 2005
INVENTOR(S) : Kausch, William L.

It is certified that error appears in the above-identified patent and that said Letters Patent is hereby corrected as shown below:

Column 18,
Line 19, after "crosslinked" insert -- ; --.
Line 34, after "crosslinked" insert -- ; --.

Signed and Sealed this

Sixth Day of December, 2005

JON W. DUDAS
*Director of the United States Patent and Trademark Office*